United States Patent [19]
Green

[11] Patent Number: 4,512,225
[45] Date of Patent: Apr. 23, 1985

[54] DIFFERENTIAL INTEGRAL ROTARY KNIFE CONTROL

[75] Inventor: John L. Green, Tulsa, Okla.

[73] Assignee: Combustion Engineering, Inc., Windsor, Conn.

[21] Appl. No.: 434,763

[22] Filed: Oct. 18, 1982

[51] Int. Cl.³ .................. B26D 5/20; G05B 19/20
[52] U.S. Cl. .................................. 83/38; 83/71; 83/76; 83/298; 318/601
[58] Field of Search .......... 83/37, 38, 76, 71, 298; 318/601

[56] References Cited

U.S. PATENT DOCUMENTS

| | | | |
|---|---|---|---|
| 3,232,157 | 2/1966 | McMath et al. | 83/76 |
| 4,170,155 | 10/1979 | Saito et al. | 83/76 |
| 4,255,998 | 3/1981 | Rudszinat | 83/298 |
| 4,361,063 | 11/1982 | Larson | 83/71 |

Primary Examiner—Donald R. Schran
Attorney, Agent, or Firm—David L. Smith

[57] ABSTRACT

Motor 17 through gears 15 drives rotary knife 18 to cut continuous wallboard line 10 into predetermined lengths 26. Microprocessor 34 monitors the position of wallboard line 10 by way of roller 28 and pulse generator 30. Microprocessor 34 also monitors the position of rotary knife 18 as measured from a park position by way of pulse generator 36. The position of wallboard line 10 is compared to the distance of travel of knife 18 from the park position and a control signal proportional to the difference in positions is generated to control motor 17 and in turn drive rotary knife 18 to sever a predetermined length 26.

15 Claims, 5 Drawing Figures

DIFFERENTIAL INTEGRAL ROTARY KNIFE CONTROL

BACKGROUND OF THE INVENTION

This invention relates to controlling a rotating knife to cut a continuous, moving sheet of material into predetermined lengths.

Several difficulties are encountered when rotary knives are used for cutting a continuous moving sheet of material. If the circumference of the rotating knife cylinder is not identical to the predetermined length of material to be cut, the rotary knife cannot run continuously synchronously with the continuous moving sheet. Generally, the circumference of the rotary knife is less than the predetermined lengths into which material is cut which necessitates that the rotating knife speed be changed during each rotation. One method to allow for a sufficient length of material to pass the cut point before the knife completes its rotation and cuts another predetermined length of material requires that the knife be parked during a portion of each revolution. Once the knife is stopped in a park position, the complexity of controlling the knife is compounded because the knife rotation must be started at an appropriate time and the rotation controlled in such a manner as to synchronize the rotating knife with the moving line of material to cause the knife to cut a predetermined length of material. Many feedback control methods exist to determine when the knife rotation should commence from a park position and how the rotation of the knife should be controlled to properly cut a predetermined length of material. The control method should provide accurate starting, accelerating and positioning of the knife with respect to the moving material line to cut the material into predetermined lengths. Accurate yet simple control is of even greater concern when the control method is implemented using a microprocessor and control in real time necessitates that the calculation be accurate yet not complex, thereby permitting real time control of the rotating knife. Many of the prior art control methods were too complex and therefore did not lend themselves to real time control implemented using a microprocessor.

SUMMARY OF THE INVENTION

The present invention provides a method and apparatus for controlling a moving knife in a continuous sheet cutting process for cutting the continous sheet into predetermined lengths wherein the moving knife is maintained in a park position until a predetermined length of the continuous sheet has passed the location where the cut is made. As the material line continues past where the cut is made, the position of the material is compared to the position of the moving knife and a control signal proportional to the difference in position between the material line and the distance of travel of the knife from the park position is generated to drive the moving knife. The moving knife starts from rest at the park position and accelerates to a speed greater than a speed synchronous with the material line then decelerates to a speed synchronous with the material line prior to cutting the continous moving sheet of material into a predetermined length then operates synchronous with the material line until the knife returns to the park position.

The moving knife severs a predetermined length from the continuous sheet of material with the length severed not measured from the first end cut to the second end cut but rather from the knife reaching the park position until the knife again reaches the park position which corresponds to measuring from (1) a distance from the first end cut equal to the length of continuous material that passes the cut point between the time the first end cut is made and when the knife reaches the park position, and (2) a predetermined point that is a predetermined length from where the measuring commences in (1), with the second end cut being made short of the predetermined point by the length of the continuous sheet of material which passed the cut point subsequent to the preceding cut as defined in (1) prior to beginning to measure the present predetermined length.

The moving knife then follows through the cut and returns to the park position before commencing another cycle. This control method provides accurate yet simple positioning of the moving knife which lends itself to real time control implemented using a microprocessor.

DESCRIPTION OF THE PREFERRED EMBODIMENT

Figure 1:
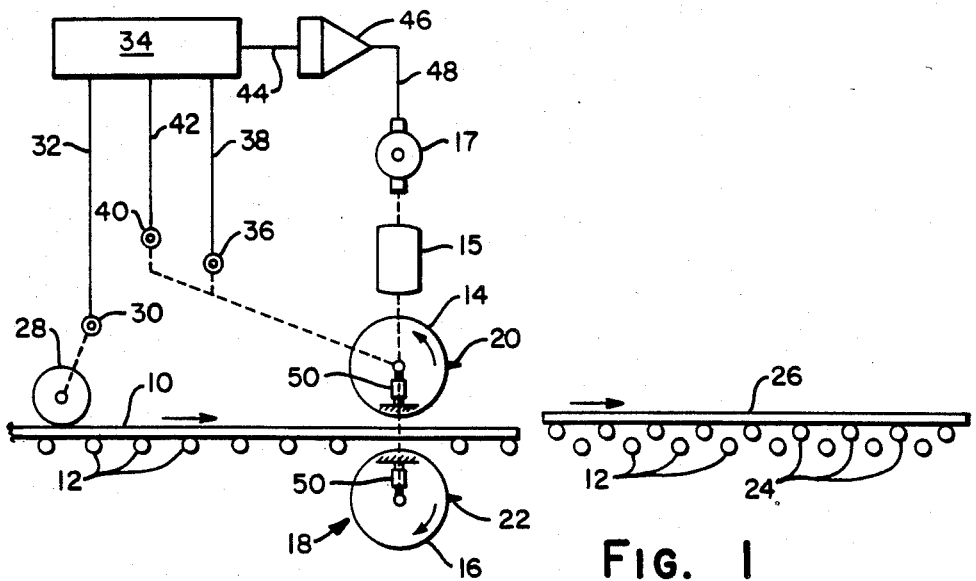
FIG. 1 is a side view of a continuous sheet cutting process and schematic control system embodying the present invention.

Referring to the drawing, there is depicted therein a continuous sheet cutting process and control system in accordance with the present invention as best seen in FIG. 1. Continuous wallboard line 10 is shown moving to the right on rollers 12 which support wallboard line 10. Wallboard line 10 passes between cylinders 14 and 16, of knife 18. A single blade 20 and 22 is shown on each knife cylinder 14 and 16, respectively. Knife cylinders 14 and 16 are interlocked through gears 15 such that motor 17 rotates knife cylinder 14 counter-clockwise from the perspective of FIG. 1 and knife cylinder 16 clockwise from the perspective of FIG. 1. When knife cylinders 14 and 16 rotate such that blades 20 and 22 are closest together, a cleavage is made across the width of wallboard line 10. This occurs when blade 20 of knife cylinder 14 is in the six o'clock position and blade 22 of knife cylinder 16 is in the twelve o'clock position.

Blades 20 and 22 do not completely sever the wallboard but rather penetrate wallboard line 10 sufficiently to cut the paper. Wallboard line 10 continues to the right whereupon rollers 24 which rotate approximately twice as fast as the line speed of wallboard 10 raise and pull the cut length 26 apart from wallboard line 10 and pass cut length 26 to the right to a transfer table, not shown. Rollers 24 then return to a position lower than rollers 12 to accommodate wallboard line 10 extending beyond the cut point.

Roller 28 is in contact with the surface of wallboard line 10 and coupled to pulse generator 30. Pulse generator 30 generates a series of electrical pulses as a function of the length of continuous wallboard line 10 passing roller 28, typically 1320 pulses per foot. The electrical pulses are passed by way of conductor 32 to microprocessor 34. The pulses generated by pulse generator 30 are accumulated in microprocessor 34 and represents the length of wallboard line that has been measured since the accumulation of pulses generated by pulse generator 30 was last reset to zero.

Pulse generator 36 generates pulses as a function of the distance of travel of knife 18 from the park position. Pulse generator 36 generates, typically, 5280 pulses in 360° of travel. The pulses generated by pulse generator 36 are passed to microprocessor 34 on conductor 38. The pulses generated by pulse generator 36 are accumulated in microprocessor 34 and represent the distance of travel of knife 18 from the park position since the accumulation of pulses generated by pulse generator 36 was last reset to zero.

Pulse generator 40 generates one pulse per revolution of knife 18 upon returning to the park position. The pulse generated by pulse generator 40 resets to zero the accumulated pulse counts generated by pulse generators 30 and 36. The pulses generated by pulse generator 40 are passed to microprocessor 34 on conductor 42.

Microprocessor 34 is a portion of a rotary knife controller that performs calculations on a continuing basis to control rotary knife 18 such that the continuous moving sheet of material is cut into predetermined lengths. To aid in the understanding of the calculations performed by microprocessor 34, the following symbols are defined:

Blade Travel—BT: The distance in pulses through which the knife tip travels in one revolution, typically a constant of 5280 pulses.

Control Error—CE: An error signal representing the relative magnitude of a control signal necessary to bring the knife position counter equal to the theoretical cutting point.

Control Voltage—CV: The voltage output of the rotary knife controller applied to the knife drive motor, evaluated only when the control error is greater than zero.

Knife Constant—KC: A constant equal to the ratio of the number of 0.01 inch segments per foot (1200) divided by the number of pulses generated when the knife tip travels one foot. The constant is unique to a particular knife mechanical design and in the best mode presently contemplated this constant is 0.953.

Gain—G: The ratio of the number of pulses of tracking error required to produce one control error unit.

Knife Position—KP: The current pulse count from the knife encoder indicating the distance in pulses that the knife has traveled since the knife last reached the park position.

Length—L: The desired length into which the continuous moving sheet of material is cut as measured in line pulses and corrected for the physical considerations in the equation defining this term.

Length of Cut—LOC: The predetermined length into which the continuous moving sheet of material will be cut in 0.01 inch increments.

Line Correction—LC: A factor corresponding to the number of pulses that the knife tip must track behind the target point to generate a control error equal to that which will make the knife run continuously at the current line speed. In normal operation, this is a constant.

Line Position—LP: The current accumulated pulse count from the line encoder indicating the distance in pulses that the line has travelled since the knife last reached the park position.

Maximum Control Error—MCE: The largest value that the control error variable can attain. This value is assigned somewhat arbitrarily, is used to scale the control error and determines the degree of control error resolution.

Maximum Voltage—MV: The maximum control voltage corresponding to the maximum voltage applied to the knife drive motor and in turn the fastest knife tip velocity possible.

The above defined variables are interrelated in the following equations:

$$L = (LOC/KC) - LC \quad (1)$$

$$CE = ((BT - (L - LP)) - KP)/G \quad (2)$$

$$CV = (CE/MCE) \times MV \quad (3)$$

Equation (1) defining length need only be evaluated each time one of the parameters of the equation changes such as a change in the predetermined length into which the continuous moving sheet of material will be cut.

Equation (2) defining control error is evaluated repeatedly. Distances are represented by pulse counts. Variable L is taken from the calculation of Equation (1). BT is a contant representing the circumference of the knife, which varies from installation to installation.

The (L-LP) Term

This term compares the desired length as corrected for physcial considerations to the current line position. Since the accumulated pulse count of pulse generator 30 is reset to zero each time knife 18 returns to the park position, this term ranges from a maximum of L when the knife 18 has just returned to the park position to a minimum of zero just prior to knife 18 returning to the park position.

The (BT−(L-LP)) Term

Since BT is a constant representing the circumference of knife 18, this term will range from a minimum of (BT−L) to a maximum of BT. The quantity BT−L will be negative when the desired length is greater than the circumference of knife 18. This term will equal zero when the difference between the desired length to be cut and the present line position equals the circumference of the knife; at that time it is appropriate to commence rotation of the knife.

The variable KP remains zero until the knife begins to rotate. As long as the knife remains in the park position and the quanity BT−L is negative, the control error is a negative quantity and maintains knife 18 in the park position. When the desired length less line position becomes less than the circumference of knife 18, a position error exists between the line position and the knife position. This error generates by way of Equation (3) above a motor 17 digital drive signal that is the output of the controller. The control error is normalized by the maximum control error then multiplied times the maximum voltage that could be applied to drive motor 17. The control voltage thus calculated is a digital drive signal that is conducted to digital-to-analog converter 46 on conductor 44. Digital-to-analog converter 46 generates an analog signal to drive motor 17 based on the magnitude of the digital drive signal. The analog motor 17 drive signal is conducted to motor 17 on conductor 48.

Figure 2:
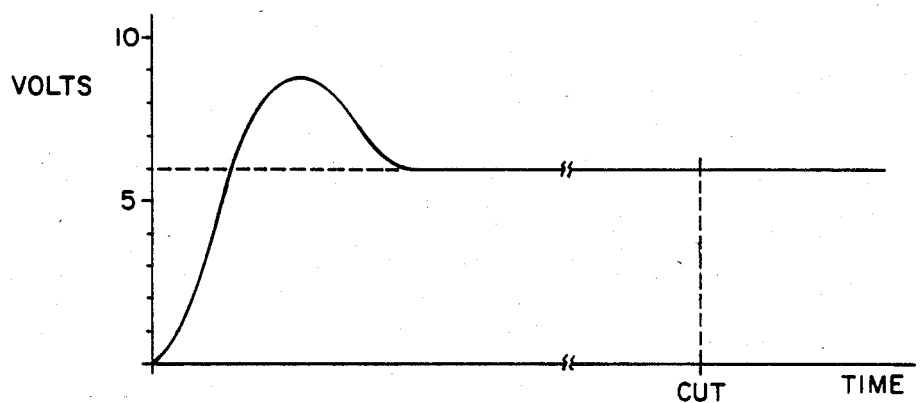
FIG. 2 is a typical control signal generated to drive the rotary knife motor.

A typical graph of control voltage as a function of time is shown as FIG. 2. The vertical axis represents the voltage applied to motor 17 as generated by digital-to-analog converter 46, ranges from zero to ten volts, and corresponds to knife velocity. The horizontal axis represents time with zero being the time a position error between the position of the knife and the position of the wallboard line first develops.

The position error automatically corrects for the line position ahead of the knife position or the knife position ahead of the line position after the knife begins to rotate. When the knife position KP is smaller than the line position, the knife must be advanced in position to catch up to the wallboard line postion. Hence, the control error increases in magnitude. This can be seen in FIG. 2 as the control voltage, initially at zero increases as the difference between the line position and the knife position increases such that the knife tip velocity increases from rest to a velocity greater than the line velocity. As seen in FIG. 2, after the knife velocity exceeds the line velocity and the position error decreases, the knife velocity decreases to the velocity of the wallboard line with little or no overshoot at which time there is no difference between the knife position and the wallboard line position save the line correction factor. The line correction factor corresponds to the number of pulses that the knife tip must track behind the target point to generate a control error equal to that which will make the knife 18 run continuously at the current wallboard line speed.

Although not shown in FIG. 2, when the knife position is greater than the line position, the control error decreases in magnitude to allow the wallboard line position to catch up to the knife position. This would occur when knife 18 is operating synchronously with the wallboard line and wallboard line 10 decreases in speed. The knife position would temporarily be ahead of the wallboard line position until the control system reduced the position error to zero.

To determine whether knife 18 is operating synchronously with wallboard line 10, the rate of change of the position error is monitored. When the rate of change of position error is zero, the change in position error has been reduced to zero. It follows that when knife 18 is operating synchronously with wallboard line 10 that the linear distance traversed by a blade of knife 18 per unit of time equals the velocity of wallboard line 10. After achieving synchronous operation with wallboard line 10, knife 18 continues operating synchronously with wallboard line 10 until returning to the park position.

Knife drive motor 17 is a dc motor and is chosen such that the voltage applied to drive motor 17 is in the middle range when motor 17 is operating synchronously with the wallboard line. In this manner, the control error can generate a control voltage that corresponds to a wallboard line velocity that exceeds the normal wallboard line velocity and permit the position error to drive motor 17, initially at rest, to a speed in excess of the line velocity such that the change in position error between the knife position and the line position can be reduced to zero before the wallboard line is cut.

When the change in position error is reduced to zero and the control error is driving motor 17 at a velocity synchronous with wallboard line 10, knife 18 is in the proper position relative to wallboard line 10 to cut the predetermined length. The length 26 of wallboard cut off by knife 18 appears to be shorter than the desired length by the length of wallboard passing the cut point subsequent to the cut and prior to the knife returning to the park position. Each length 26 of cut wallboard is longer on the leading edge by that length and shorter on the trailing edge by the same length with the net effect that the wallboard has been cut to the desired length, with the exception of the first piece of wallboard which is normally scrapped. In this manner, control of the rotary knife is independent of the park position and the park position can thus be located anywhere around the circumference of the knife cylinder where the knife blade does not interfere with the passing of continuous wallboard line 10 that also allows rotating knife 18 to accelerate to be synchronous with wallboard line 10 and have reduced the change in position error to zero before the cut is made.

Figure 3:
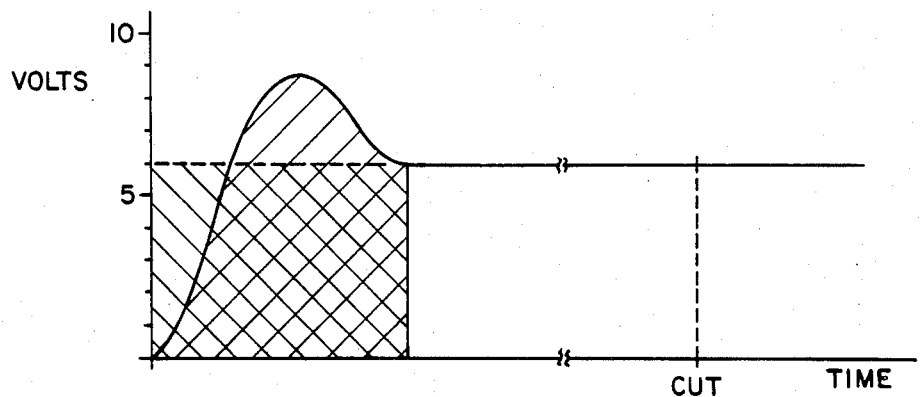
FIG. 3 is a graphical comparison of the area under two curves where tne rotary knife drive motor does not reach saturation.
Figure 4:
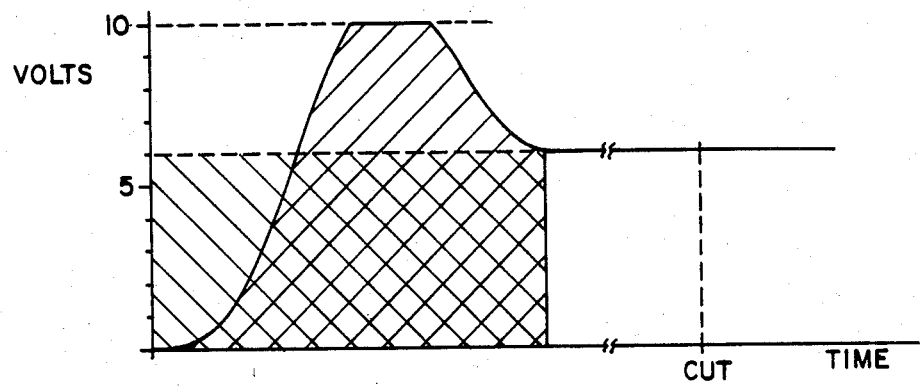
FIG. 4 is a comparison of the area under two curves where the rotary knife drive motor does reach saturation.

The area under the control voltage curve from the time of initial rotation of motor 17 until the change in position error is reduced to zero and motor 17 is synchronized with wallboard line 10 and is identical to the area under the synchronous speed curve from the time of initial rotation until the position error is reduced to zero and knife 18 synchronized with wallboard line 10. This relationship holds both as shown in FIG. 3 where the control voltage does not saturate and as shown in FIG. 4 where the control voltage saturates, that is, reaches and temporarily remains at the maximum voltage applied to motor 17 before decreasing to a voltage level which drives motor 17 such that knife 18 is synchronous with wallboard line 10.

Figure 5:
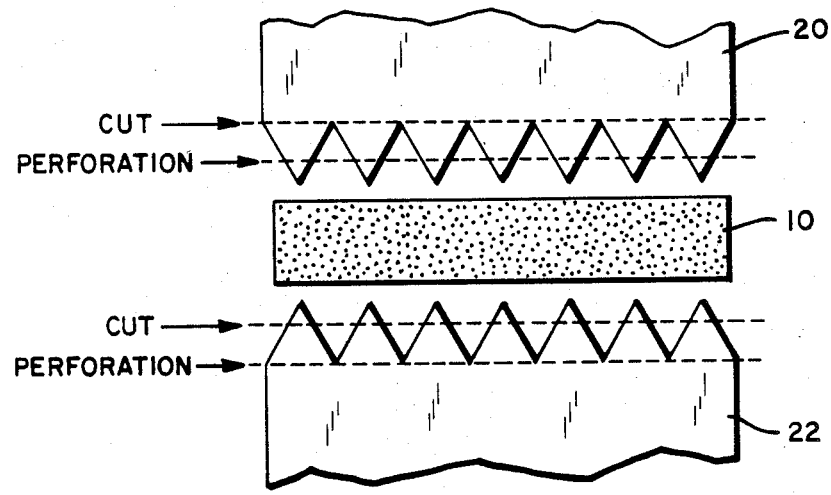
FIG. 5 shows the relative depth of penetration of a knife blade for both a cut and a perforation.

At the time continuous wallboard line 10 is cut to predetermined lengths 26, the wallboard has not been cured. The purpose of cutting the wallboard with knife 18 is to cut the paper, with rollers 24 effectively pulling the gypsum apart. There are times when it is desired to follow a cut with one or more perforations prior to a subsequent cut. The paper is not completely cut in the perforation operation but results in a dashed line in the paper across the width of the wallboard line. This is achieved by energizing air cylinders 50 such that the knife blades 20 and 22 on cylinders 14 and 16 do not penetrate as far into the wallboard. FIG. 5 shows blades 20 and 22 as well as a cross-section of wallboard line 10 and indicates the relative depth the blades enter wallboard line 10 for both a cut operation and a perforation operation.

As the blade enters the wallboard, the blade is not perpendicular to the surface of the wallboard and a small error in location of cut results. The wallboard lengths 26 are slightly longer than the final product. After the wallboard is cured, it is trimmed at both ends to the proper length and the trimming operation removes more material than the error introduced when the cut occurs. Thus, the error due to the blade not entering the wallboard perpendicular to the surface is immaterial.

In the above manner, the control method can be executed very rapidly to permit several calculations per second. This in turn permits updating the inputs to the microprocessor and the output from the microprocessor frequently, resulting in real time control. Furthermore, this control method permits cutting any length of wallboard by varying the parameter length of cut with the microprocessor controlling rotating knife 18 and the self-correcting aspects of the algorithm accounting for differences in position between the knife position and line position as well as variations in the wallboard line velocity.

The invention has been disclosed by way of the preferred embodiment comprising a rotary knife cutting a continuous wallboard line into predetermined lengths. Modification may be made by those skilled in the art and remain within the scope of the invention.

I claim:

1. In a continuous sheet cutting process, and method of cutting the continuous sheet of material with a moving knife into predetermined lengths comprising the steps of:
   (a) passing a continuous sheet of material past a cut point beneath the knife;
   (b) measuring the length of continuous sheet passing a fixed point since the knife last reached a park position;
   (c) measuring the distance of travel of the knife from the park position;
   (d) comparing the measured length of continuous sheet passing a fixed point since the knife last reached a park position to the distance of travel of the knife from the park position and generating a difference signal therebetween;
   (e) holding the knife in the park position until the difference signal exceeds a predetermined value indicating that a first predetermined point on the continuous sheet has reached the cut point;
   (f) initiating motion of the knife when the first predetermined point on the continuous sheet has passed the cutting point;
   (g) after the difference signal in step (e) exceeds a predetermined value, controllably moving the knife at a rate proportional to the difference in position between
      (1) the difference between the first predetermined point on the continuous sheet and the cut point, and
      (2) the distance of travel of the knife from the park position
   until the knife becomes synchronous with the continuous sheet and the variation in measured position difference is reduced to zero;
   (h) after the variation in position difference in step (f) is reduced to zero, operating the knife synchronously with the continuous sheet;
   (i) cutting the continuous sheet severing a predetermined length of the continuous sheet of material while the knife is operating synchronously with the continuous sheet; and
   (j) returning the knife to the park position synchronously with the continuous sheet.

2. A method of cutting a continuous sheet of material into predetermined lengths as recited in claim 1 wherein the step of measuring the length of continuous sheet passing the fixed point since the knife last reached a park position comprises:
   (a) reinitializing a first counter upon returning the knife to the park position;
   (b) generating pulses as a function of the length of continuous sheet passing a fixed point;
   (c) counting the pulses; and
   (d) using the accumulated number of pulses as representative of the length of continuous sheet that has passed the cutting point since the preceding cut.

3. A method of cutting a continuous sheet of material into predetermined lengths as recited in claim 1 wherein initiating motion of the knife when the first predetermined point on the continuous sheet has passed the cutting point comprises passing an electrical signal to a drive motor to initiate motion of the knife.

4. A method of cutting a continuous sheet of material into predetermined lengths as recited in claim 2 wherein initiating motion of the knife when the first predetermined point on the continuous sheet has passed the cutting point comprises passing an electrical signal to a drive motor to initiate motion of the knife.

5. A method of cutting a continuous sheet of material into predetermined lengths as recited in claim 1 wherein the step of measuring the distance of travel of the knife from the park position comprises the steps of:
   (a) reinitializing a second counter upon returning the knife to the park position;
   (b) generating pulses as a function of the distance of travel of the knife from the park position;
   (c) counting the pulses; and
   (d) using the accumulated number of pulses as representative of the distance through which the knife has passed since the knife left the park position.

6. A method of cutting a continuous sheet of material into predetermined lengths as recited in claim 1 wherein the step of moving the knife at a rate proportional to the difference in position between
   (i) the difference between the first predetermined point on the continuous sheet and the cut point, and
   (ii) the distance of travel of the knife from the park position
comprises rotating the knife at a rate proportional to the difference in position between
   (i) the difference between the first predetermined point on the continuous sheet and the cut point, and
   (ii) the distance of travel of the knife from the park position.

7. In a continuous sheet cutting process, apparatus for cutting a continuous sheet of material into predetermined lengths comprising:
   (a) means for cutting the continuous sheet of material, having a park position;
   (b) means for measuring the length of continuous sheet of material passing a fixed point since the cutting means last reached a park position;
   (c) means for measuring the distance of travel of the cutting means from the park position;
   (d) means for comparing the measured length of continuous sheet of material passing a fixed point since the cutting means last reached the park position to the distance of travel of the cutting means from the park position and generating a difference signal therebetween;
   (e) means for holding the cutting means in the park position until the difference signal exceeds a predetermined value indicating that a first predetermined point on the continuous sheet of material has reached the cut point;
   (f) means for moving the cutting means, after the difference signal exceeds a predetermined value, at a rate proportional to the difference in measured lengths between
      (i) the difference between the first predetermined point on the continuous sheet of material and the cut point, and
      (ii) the distance of travel of the cutting means from the park position, until the cutting means becomes synchronous with the continuous sheet and the rate of change of the difference in measured lengths is reduced to zero;

(g) means for operating the cutting means synchronously with the continuous sheet after the rate of change of the difference in measured lengths is reduced to zero; and (h) means for returning the cutting means to the park position synchronously with the continuous sheet.

8. Apparatus for cutting a continuous sheet of material into predetermined lengths as recited in claim 7 wherein the means for cutting the continuous sheet of material comprises a rotary knife.

9. Apparatus for cutting a continuous sheet of material into predetermined lengths as recited in claim 7 wherein the means for measuring the length of the continuous sheet of material comprises a pulse generator that generates pulses as a function of the length of continuous sheet passing the pulse generator.

10. Apparatus for cutting a continuous sheet of material into predetermined lengths as recited in claim 7 wherein the means for measuring the distance of travel of the cutting means from the park position comprises a pulse generator that generates pulses as a function of the distance of travel of the cutting means from the park position.

11. In a continuous sheet cutting process, apparatus for cutting a continuous sheet of material into predetermined lengths comprising:

(a) means for cutting the continuous sheet of material, having a park position;

(b) means for measuring the length of continuous sheet of material passing a fixed point since the cutting means last reached a park position;

(c) means for measuring the distance of travel of the cutting means from the park position;

(d) digital means receiving the measured length of (b) and the measured distance of (c) for calculating a cutting means digital output drive signal, VC, in accordance with the relationship;

$$VC = ((((BT-(L-LP))-KP)/G)/MCE) \times MV$$

wherein the symbols are defined:

Blade Travel—BT: The distance through which the knife tip travels in one revolution;

Control Error—CE: An error signal representing the relative magnitude of a control signal necessary to bring the knife position equal to the theoretical cutting point;

Control Voltage—CV: The voltage output of the rotary knife controller applied to the knife drive motor, evaluated only when the control error is greater than zero;

Knife Constant—KC: An installation dependent constant. Gain—G: The ratio of the tracking error required to produce one control error unit;

Knife Position—KP: The distance that the knife has traveled since the knife last reached the park position.

Length—L: The desired length into which the continuous moving sheet of material is cut as corrected for the physical considerations in the equation defining this term;

$$L = (LOC/KC) - LC$$

Length of Cut—LOC: The predetermined length into which the continuous moving sheet of material will be cut.

Line Correction—LC: A factor corresponding to the distance that the knife tip must track behind the target point to generate a control error equal to that which will make the knife run continuously at the current line speed. In normal operation, this is a constant;

Line Position—LP: The current distance that the line has travelled since the knife last reached the park position;

Maximum Control Error—MCE: The largest value that the control error variable can attain;

Maximum Voltage—MV: The maximum control voltage corresponding to the maximum voltage applied to the knife drive motor and in turn the fastest knife tip velocity possible.

12. Apparatus for cutting a continuous sheet of material into predetermined lengths as recited in claim 11 wherein the cutting means is a rotary knife.

13. Apparatus for cutting a continuous sheet of material into predetermined lengths as recited in claim 11 wherein the means for measuring the length of the continuous sheet of material comprises a pulse generator that generates pulses as a function of the length of continuous sheet passing the pulse generator.

14. Apparatus for cutting a continuous sheet of material into predetermined lengths as recited in claim 11 wherein the means for measuring the distance of travel of the cutting means from the park position comprises a pulse generator that generates pulses as a function of the distance of travel of the cutting means from the park position.

15. Apparatus for cutting a continuous sheet of material into predetermined lengths as recited in claim 11 further comprising means for limiting the depth of penetration into the continuous sheet of material of the cutting means.

* * * * *